United States Patent
Komiyama

(10) Patent No.: US 9,467,206 B2
(45) Date of Patent: Oct. 11, 2016

(54) ELECTRIC POWER TRANSMISSION APPARATUS, CONTACTLESS ELECTRIC POWER TRANSMISSION SYSTEM, AND SIGNAL GENERATION METHOD

(71) Applicant: Sony Corporation, Tokyo (JP)

(72) Inventor: Shinji Komiyama, Saitama (JP)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 13/860,605

(22) Filed: Apr. 11, 2013

(65) Prior Publication Data
US 2013/0278070 A1    Oct. 24, 2013

(30) Foreign Application Priority Data
Apr. 18, 2012   (JP) .................. 2012-094895

(51) Int. Cl.
   *H04B 5/00*         (2006.01)
(52) U.S. Cl.
   CPC .................. *H04B 5/0037* (2013.01)
(58) Field of Classification Search
   CPC ............ H02J 17/00; H02J 3/01; H02J 7/025; H04B 5/0037
   See application file for complete search history.

(56) References Cited

U.S. PATENT DOCUMENTS

| 8,766,629 B2 * | 7/2014 | Maehara ............. H03B 15/006 257/421 |
| 2013/0128638 A1 * | 5/2013 | Irish .............................. 363/126 |

FOREIGN PATENT DOCUMENTS

JP    2011-120216 A    6/2011

* cited by examiner

*Primary Examiner* — Jared Fureman
*Assistant Examiner* — Rafael Pacheco
(74) *Attorney, Agent, or Firm* — Chip Law Group

(57) ABSTRACT

An electric power transmission apparatus includes a resonance circuit, a first signal generation unit, and a second signal generation unit. The resonance circuit is used for contactless electric power transmission. The first signal generation unit is connected to one end of the resonance circuit, and generates a first high-frequency signal which includes one or more harmonic components using a switching method. The second signal generation unit is connected to the other end of the resonance circuit, and generates a second high-frequency signal which includes a specific harmonic component using the switching method. The first high-frequency signal is input to the one end of the resonance circuit, and the second high-frequency signal is input to the other end of the resonance circuit.

9 Claims, 5 Drawing Sheets

ELECTRIC POWER TRANSMISSION APPARATUS, CONTACTLESS ELECTRIC POWER TRANSMISSION SYSTEM, AND SIGNAL GENERATION METHOD

BACKGROUND

The present disclosure relates to an electric power transmission apparatus which transmits electric power in a contactless manner, a contactless electric power transmission system, and a signal generation method.

In contactless electric power transmission (so-called wireless power feeding), it is necessary to output a high-power sine wave signal from an electric power transmission apparatus. An apparatus which generates such a sine wave signal is called a high-frequency power source. For example, it is easy to change the signal level of the sine wave signal which is output from the high-frequency power source in an audio power amplifier or the like which does not desire a high efficiency of power conversion from the high-frequency power source to the sine wave signal at a low frequency and low power. However, in the high-frequency power source used for the wireless power feeding, which desires a high efficiency of power conversion at a high frequency and high power, it is difficult to change the output electric power. Therefore, generally, an inverter is used which generates a square wave by performing a switching operation in which high efficiency can be acquired with a simple circuit configuration.

For example, a highly-efficient high-frequency power source which can be applied to a contactless electric power transmission system includes a class E amplifier (class E inverter), a half-bridge inverter, and a full-bridge inverter (so-called H bridge circuit).

The outline of an electric power transmission apparatus which uses a general high-frequency power source will be described with reference to FIG. 1. FIG. 1 is a circuit diagram schematically illustrating a general high-frequency power source which uses a half-bridge inverter.

The electric power transmission apparatus shown in FIG. 1 includes, as an example of the simplest configuration, for example, a high-frequency power source 101, and a resonance circuit 104 (series resonance circuit) which has an electric power transmission coil 102 and a resonance capacity 103. The high-frequency power source 101 uses a half-bridge inverter as a signal generator. Since the configuration of the half-bridge inverter is well known, the detailed circuit configuration thereof is omitted. The high-frequency power source 101 generates a square-wave signal as a high-frequency output signal, and supplies the square-wave signal to the resonance circuit 104.

However, every high-frequency power source is an inverter which generates a square wave using a switching method. The square wave which is the output signal includes a lot of harmonics, and relates to unnecessary radiation from the electric power transmission apparatus.

Japanese Unexamined Patent Application Publication No. 2011-120216 discloses an antenna driving apparatus that includes a trapezoidal wave signal generation circuit which generates a trapezoidal wave signal based on a square-wave signal at a predetermined frequency, and a trapezoidal wave signal amplifier circuit which amplifies the trapezoidal wave signal and supplies the amplified trapezoidal wave signal to an antenna negative load. In the antenna driving apparatus, the trapezoidal wave signal amplifier circuit supplies a normal phase output signal and a reverse phase output signal, the phases of which are reversed from each other, to both ends of the antenna negative load, and doubles a voltage which is applied to the negative load.

SUMMARY

If an AC signal which includes harmonic components is supplied to the electric power transmission coil of the electric power transmission apparatus, unnecessary radiation occurs. Therefore, even when, for example, a fundamental wave is selected at Industry Science Medical (ISM) bands which are at a level in which a radiation limiting value is high, there is a case in which the harmonics is beyond a standard value. The ISM bands are frequency bands which are designated by the International Telecommunication Union (ITU) in order to use an electric wave as a high-frequency energy source for only industrial, science, and medical purposes other than wireless communication. For example, the ISM bands in the United States of America are 6.78 MHz, 13.56 MHz, and 27.12 MHz. If a power feeding signal is set to 6.78 MHz, the third harmonic is 20.34 MHz in non-ISM bands.

In the technology disclosed in Japanese Unexamined Patent Application Publication No. 2011-120216, it is difficult to selectively control the above-described specific harmonic components which are included in a fundamental wave.

It is desirable to provide a high-frequency power source which can selectively control a specific harmonic component.

According to an embodiment of the present disclosure, a first signal generation unit generates a first high-frequency signal which includes one or more harmonic components using a switching method, and a second signal generation unit generates a second high-frequency signal which includes a specific harmonic component using the switching method. Further, a composition signal is generated by differentially driving the first high-frequency signal and the second high-frequency signal.

According to the embodiment of the present disclosure, a frequency and an amplitude of the second high-frequency signal are obtained by appropriately adjusting a frequency and an amplitude of the first high-frequency signal, and thus the specific harmonic component is cancelled or reduced when the first high-frequency signal and the second high-frequency signal are composed.

According to the present disclosure, it is possible to selectively cancel or reduce the specific harmonic component from the first high-frequency signal while using a general switching method.

DETAILED DESCRIPTION OF EMBODIMENTS

Figure 1:
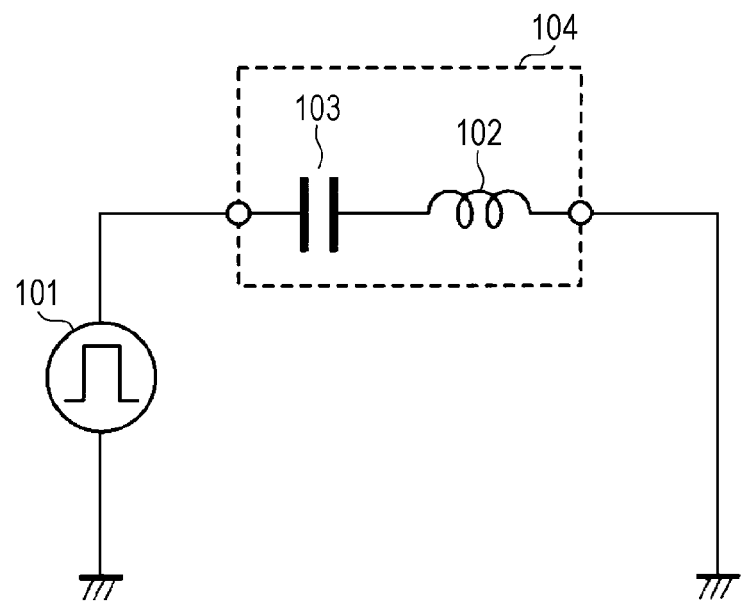
FIG. 1 is a circuit diagram schematically illustrating a general high-frequency power source which uses a half-bridge inverter.

Hereinafter, an example of a form to implement the present disclosure (hereinafter, referred to as an embodiment) will be described. In the present specification and drawings, components which substantially have the same function and configuration are indicated using the same reference numerals, thereby redundant description is omitted. Description will be made in the following order:

1. Example of Configuration of Electric Power Transmission Apparatus
2. Description of Signal Wave Form and Frequency Component
3. Configuration Example of Contactless Electric Power Transmission System
4. Modification Example In an electric power transmission apparatus (high-frequency power source) according to an embodiment of the present disclosure, a signal generator which generates a high-frequency Alternate Current (AC) signal (high-frequency signal) using a switching method is used at one end of a resonance circuit which includes an electric power transmission coil, and the high-frequency signal is supplied to the one end of the resonance circuit. On the other hand, a signal generator which generates a harmonic cancellation high-frequency signal is connected to the other end of the resonance circuit, a subtraction process is performed on the high-frequency signals which are provided to both ends by differentially driving two high-frequency power sources, and thus specific harmonic components (and odd-order harmonic components) are cancelled or reduced.

1. Configuration Example of Electric Power Transmission Apparatus

Outline of Electric Power Transmission Apparatus

Figure 2:
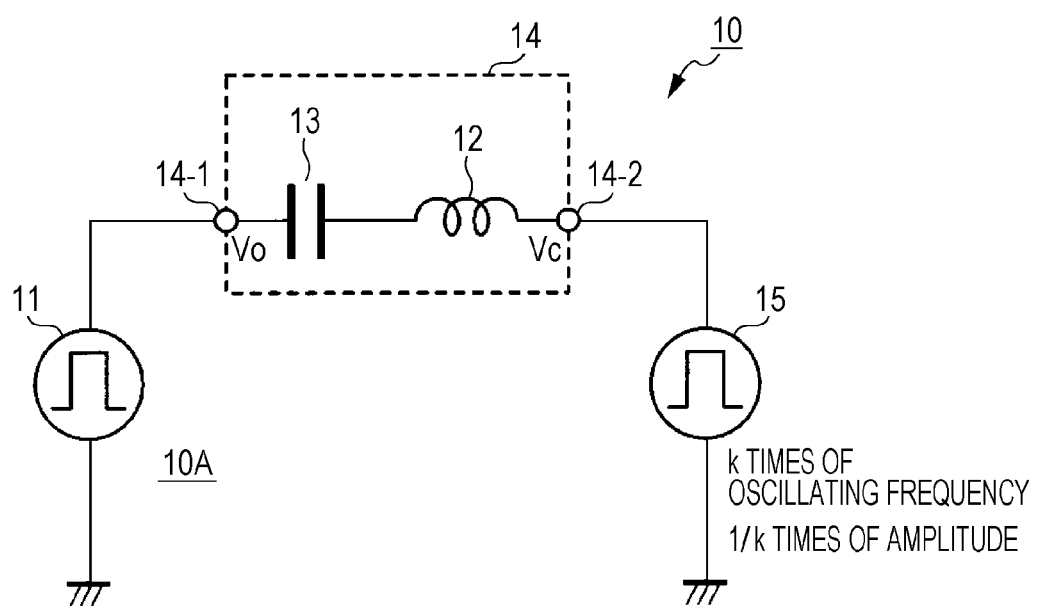
FIG. 2 is a circuit diagram schematically illustrating a high-frequency power source according to an embodiment of the present disclosure.

FIG. 2 is a circuit diagram schematically illustrating a high-frequency power source according to the embodiment of the present disclosure.

An electric power transmission apparatus 10 includes a high-frequency power source 10A and a resonance circuit 14 (an example of a negative load) to which an AC signal output from the high-frequency power source 10A is supplied.

The high-frequency power source 10A includes a signal generator 11 (an example of a first signal generation unit), and a signal generator 15 (an example of a second signal generation unit) which is used to supply an AC signal (high-frequency signal) at a high-frequency for harmonic cancellation.

The signal generator 11 generates a substantially square-wave signal (first high-frequency signal) based on a switching operation, and supplies the first high-frequency signal to one end of the resonance circuit 14. The signal generator 11 generates the first high-frequency signal, which has a designated frequency (for example, MHz order) and an amplitude, under the control of a control unit 16 (refer to FIG. 3) which will be described later.

The signal generator 15 generates a second high-frequency signal which has a substantially square wave having an amplitude and a frequency which are different from those of the first high-frequency signal which is generated by the signal generator 11 by a specified amount, and supplies the second high-frequency signal to an end of the resonance circuit 14. For example, the same configuration as that of the signal generator 11 is used for the signal generator 15.

The resonance circuit 14 is a series resonance circuit which connects an electric power transmission coil (a primary side coil) 12 to resonance capacity (which is also called capacitance) 13 in series. The resonance circuit 14 resonates at a predetermined frequency $f\ (=1/\{2\pi\sqrt{(LC)}\})$ which is determined using the inductance value of the electric power transmission coil 12 and the capacitance value of the resonance capacity 13.

The first high-frequency signal which is output from the signal generator 11 and the second high-frequency signal which is output from the signal generator 15 are respectively supplied to one end 14-1 and the other end 14-2 of the resonance circuit 14. Therefore, a signal (voltage Vo-Vc), which is obtained by combining the first high-frequency signal (voltage Vo) which is applied to one end 14-1 with the second high-frequency signal (voltage Vc) which is applied to the other end 14-2, is applied to the resonance circuit 14.

Meanwhile, the above-described first high-frequency signal and the second high-frequency signal may be high-frequency signals which are generated using a switching method and which include specific harmonic components. For example, it is possible to use a square-wave signal as an example of a signal which includes a plurality of harmonic components. In this case, the square-wave signal may be a high-frequency signal which has a substantially square wave, and may be a high-frequency signal which is considered to be a substantially square wave. For example, a signal which has a wave form having a blunt square wave or a signal which has a wave form like an approximately trapezoid is included. That is, when the first high-frequency signal which has a substantially square wave which is deformed, and the second high-frequency signal which has the different amplitude and frequency from those of the first high-frequency signal by a specified amount are supplied to a negative load (a resonance circuit in this example), these high-frequency signals are considered to be substantially square waves if the same or similar operation and advantage are obtained as those of the present disclosure which will be described below.

In addition, the configuration of the resonance circuit 14 which is an example of the negative load is not limited to this example. As the resonance circuit, for example, the resonance capacity may be electrically arranged with regard to the electric power transmission coil in series, in parallel, or arranged to be a connection which combines connection in series with connection in parallel.

For example, the resonance capacity may be a capacity which is connected to the electric power transmission coil 12 so as to be electrically parallel to the electric power transmission coil 12, or a capacity which is connected to the electric power transmission coil 12 so as to combine electrically series and parallel configurations to the electric power transmission coil 12.

Detailed Example of Electric Power Transmission Apparatus

Figure 3:
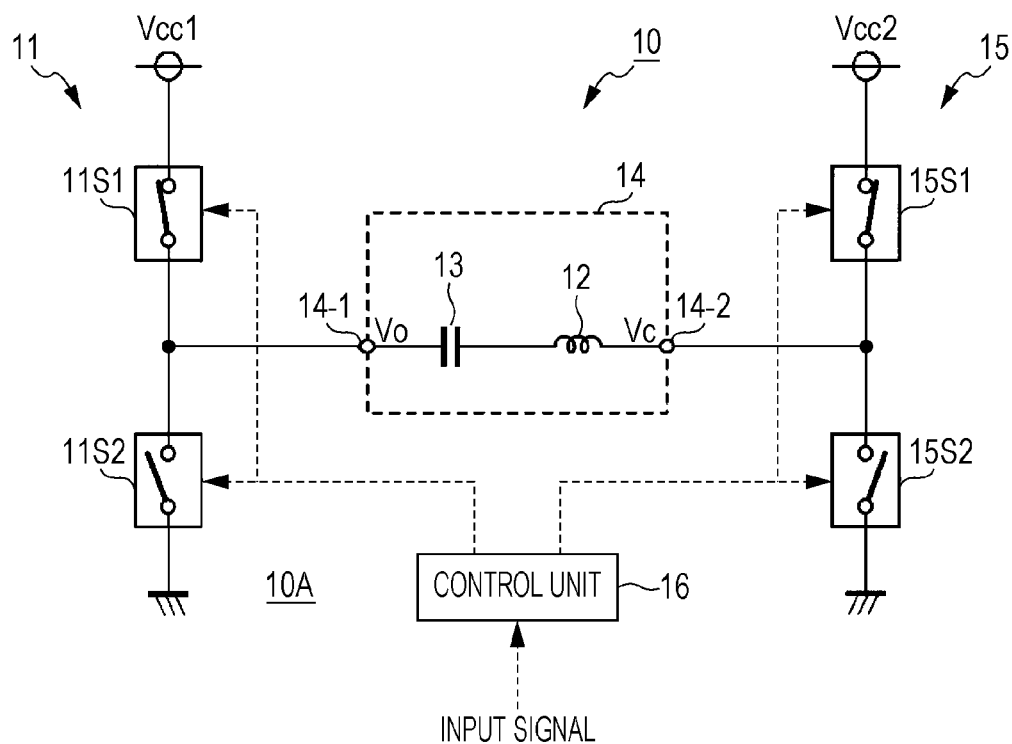
FIG. 3 is a circuit diagram illustrating a detailed example of the high-frequency power source according to the embodiment of the present disclosure.

FIG. 3 is a circuit diagram illustrating a detailed example of the high-frequency power source 10A of the electric power transmission apparatus 10 in FIG. 2.

This is an example in which a half-bridge inverter is used as the signal generators 11 and 15 which are included in the high-frequency power source 10A.

The high-frequency power source 10A includes the signal generator 11 which generates the first high-frequency signal, the signal generator 15 which generates the second high-frequency signal, and the control unit 16 which controls the driving of the signal generator 11 and the signal generator 15.

The control unit 16 generates a driving signal in response to an input signal (a control signal) and supplies the driving signal to the signal generators 11 and 15, and controls the generation of a signal performed by the signal generators 11 and 15. For example, an arithmetic processing unit, such as a microcomputer or a CPU, is as applied to the control unit 16. For example, the input signal is automatically generated based on a predetermined setting value or an execution program or generated based on an operation performed by a user.

The signal generator 11 is a half-bridge inverter which includes a switching element 11S1 (an example of a first switching unit) and a switching element 11S2 (an example of a second switching unit) which are connected in series, and a power-supply voltage Vcc1 is supplied thereto. The connection middle point between the switching element 11S1 and the switching element 11S2 is connected to one end 14-1 of the resonance circuit 14.

The signal generator 15 is a half-bridge inverter which includes a switching element 15S1 (an example of a third switching unit) and a switching element 15S2 (an example of a fourth switching unit) which are connected in series, and a power-supply voltage Vcc2 is supplied thereto. The connection middle point between the switching element 15S1 and the switching element 15S2 is connected to the other end 14-2 of the resonance circuit 14.

As an example, it is possible to use Metal-Oxide-Semiconductor Field-Effect Transistors (MOSFETs) for power generation as the switching elements 11S1, 11S2, 15S1, and 15S2. The MOSFET for power generation is also called a power MOSFET. For example, in this example, P-channel MOSFETs are used as the switching elements 11S1 and 15S1, and N-channel MOSFETs are used as the switching elements 11S2 and 15S2.

The signal generator 11 generates the first high-frequency signal by turning on or off the switching element 11S1 and the switching element 11S2 in the high interval and the low interval of the first high-frequency signal which is desired to be generated under the control of the control unit 16.

At the same time, the signal generator 15 generates the second high-frequency signal by turning on or off the switching element 15S1 and the switching element 15S2 in the high interval and the low interval of the second high-frequency signal which is desired to be generated under the control of the control unit 16.

At this time, a period which is the total time of the high interval and the low interval of the second high-frequency signal is a fraction of a predetermined number of the period of the first high-frequency signal, that is, the frequency of the second high-frequency signal is a multiple of the predetermined number of the frequency of the first high-frequency signal. In addition, the amplitude of the second high-frequency signal is the fraction of the predetermined number of the amplitude of the first high-frequency signal.

In this example, since the amplitude of the second high-frequency signal which is generated by the signal generator 15 is less than the amplitude of the first high-frequency signal, for example, the power-supply voltage Vcc2 is lower than the power-supply voltage Vcc1.

As described above, the control unit 16 causes the signal generator 11 to generate the first high-frequency signal which has a predetermined frequency and an amplitude, and causes the signal generator 15 to generate the second high-frequency signal which is obtained by appropriately adjusting the frequency and the amplitude of the first high-frequency signal. Further, the phases of the first high-frequency signal and the second high-frequency signal are combined and applied to both ends 14-1 and 14-2 of the resonance circuit 14, respectively, and a composition signal, that is, an operation signal (voltage Vo-Vc) is supplied between both ends.

In the embodiment, the frequency and the amplitude of the second high-frequency signal which is generated by the signal generator 15 are values obtained in such a way as to increase the frequency of the first high-frequency signal which is generated by the signal generator 11 to a multiple of the predetermined number and to reduce the amplitude to a fraction of the predetermined number. Further, at least one harmonic component of the harmonic components included in the first high-frequency signal is cancelled out or reduced by generating the composition signal using the differential between the first high-frequency signal and the second high-frequency signal.

More preferably, the frequency and the amplitude of the second harmonic signal are respectively adjusted to k times (k is natural number) of the frequency of the first high-frequency signal and to a fraction of k of the amplitude. Further, a subtraction process is performed on the first high-frequency signal and the second high-frequency signal, with the result that the k-th harmonic of the first high-frequency signal is cancelled out or reduced using the fundamental wave of the second high-frequency signal, and thus it is possible to cancel or reduce at least the k-th harmonic of the first high-frequency signal from the composition signal.

Meanwhile, in the high-frequency power source 10A according to the embodiment, it is possible to cause the configuration of a final stage which supplies the first and the second high-frequency signals to the resonance circuit 14 to have the same form as that of the full-bridge inverter.

These circuits of the high-frequency power source 10A may be configured with an integrated circuit such as a so-called microcontroller (MCU).

2. Description of Signal Wave Form and Frequency Component

Subsequently, the first high-frequency signal Vo (main signal) which is generated by the signal generator 11, the second high-frequency signal Vc (cancellation signal) which is generated by the signal generator 15, and the composition signal Vo-Vc (differential signal) thereof will be described with reference to FIGS. 4A to 5B.

Figure 4A:
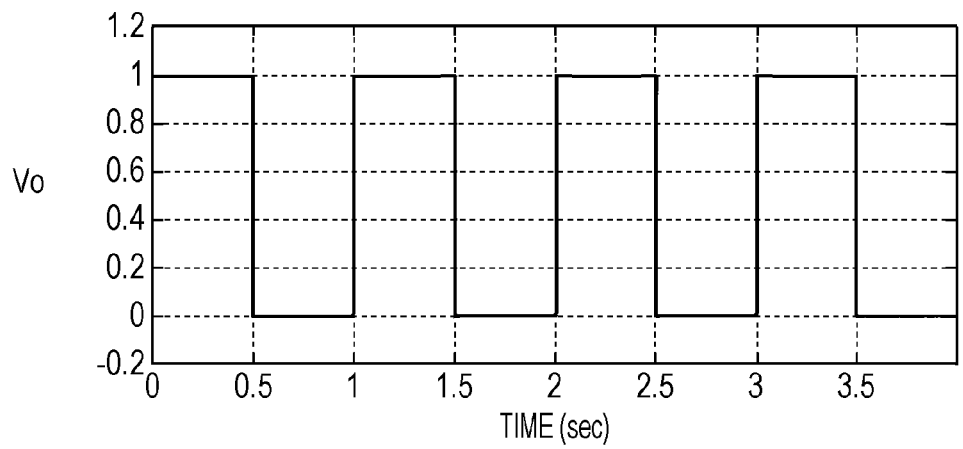
FIG. 4A is a graph illustrating the voltage of a first high-frequency signal.
Figure 4B:
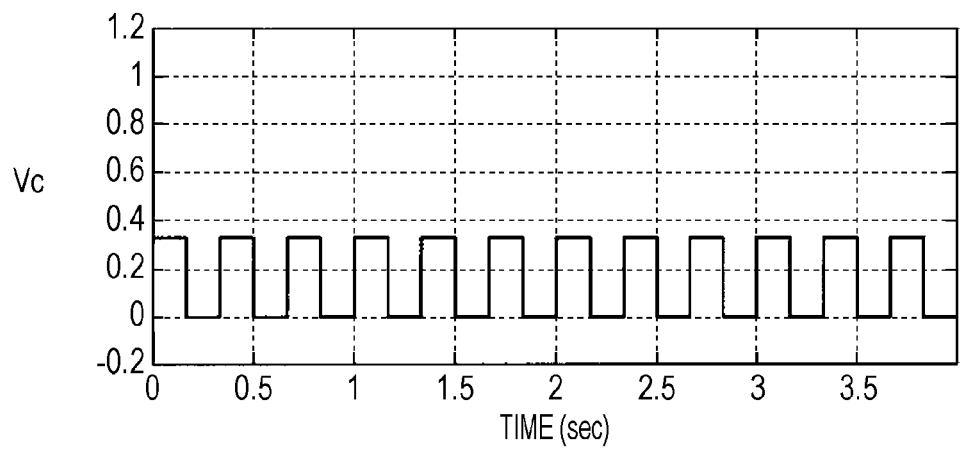
FIG. 4B is a graph illustrating the voltage of a cancellation second high-frequency signal.
Figure 4C:
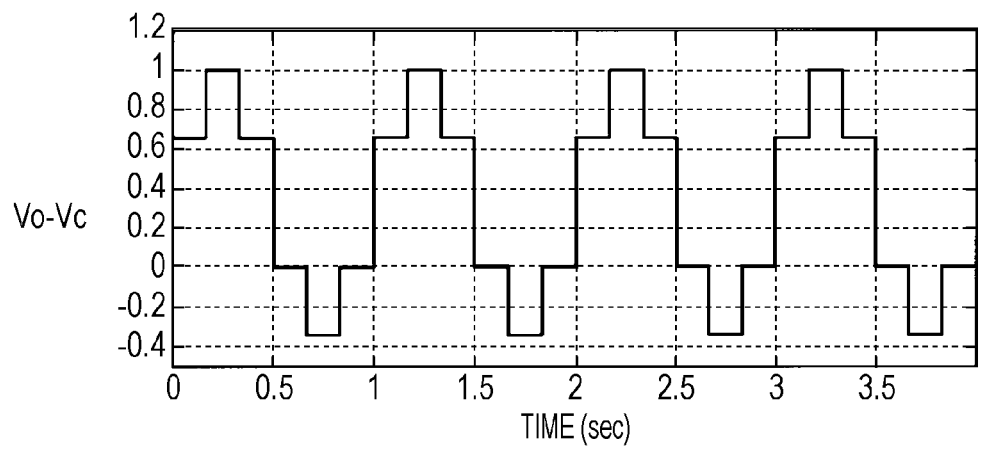
FIG. 4C is a graph illustrating the wave form of the voltage of a signal which is applied to a negative load.
Figure 5A:
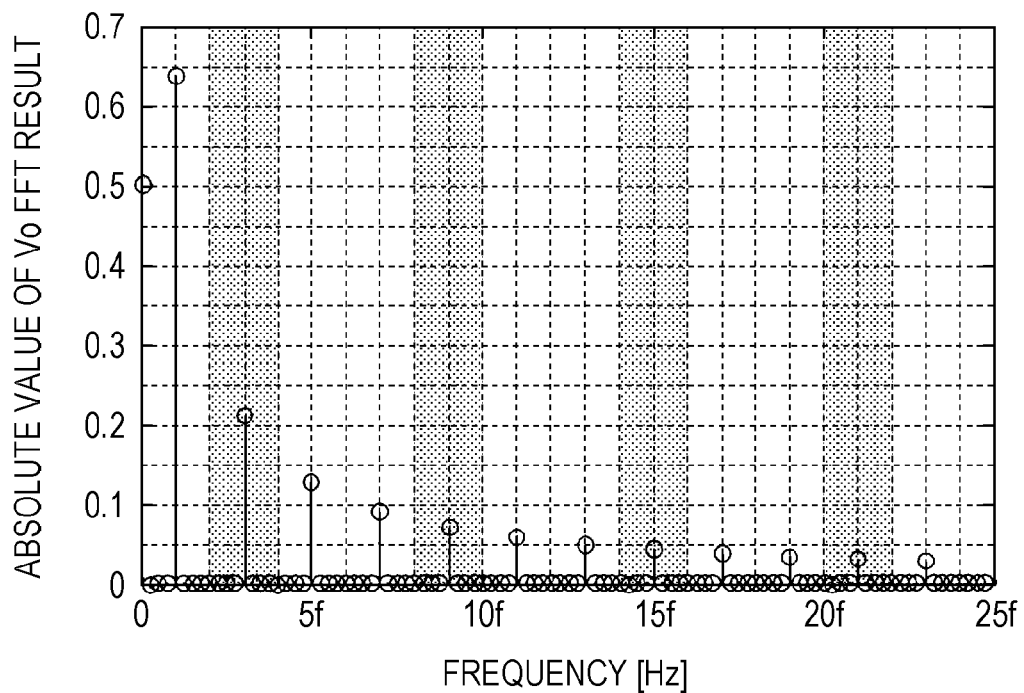
FIG. 5A is a graph illustrating absolute values for respective frequencies after fast Fourier transformation is performed on the first high-frequency signal.
Figure 5B:
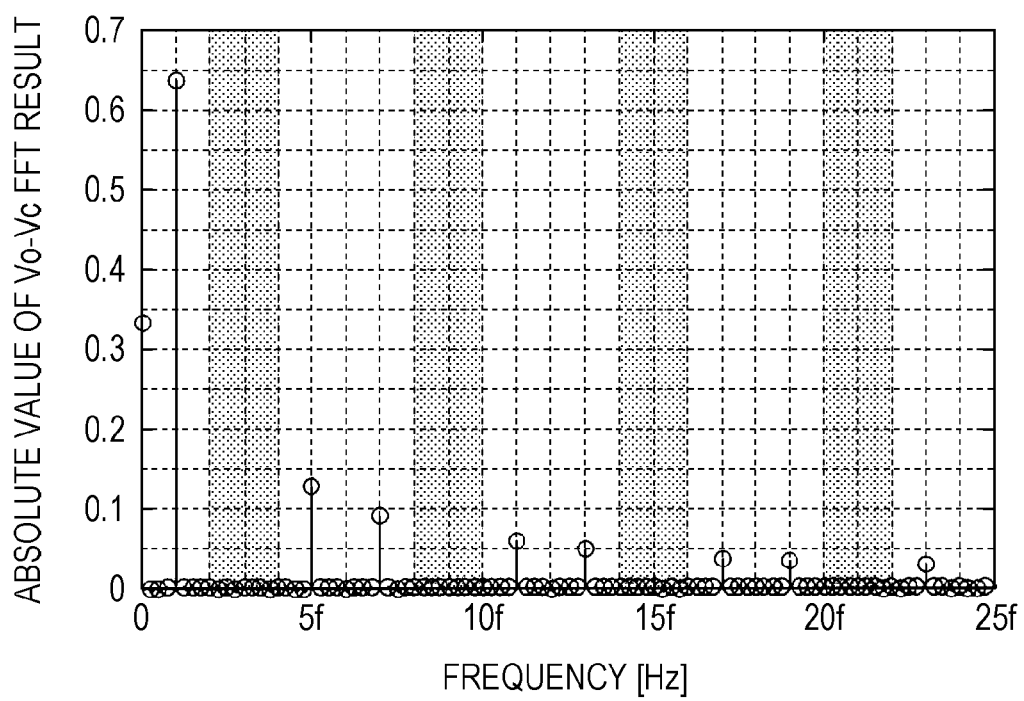
FIG. 5B is a graph illustrating absolute values for respective frequencies after fast Fourier transformation is performed on the signal which is applied to the negative load.

FIG. 4A illustrates the voltage of the first high-frequency signal Vo which is measured at one end 14-1 of the resonance circuit 14, FIG. 4B illustrates the voltage of the second high-frequency signal Vc which is measured at the other end 14-2 of the resonance circuit 14, and FIG. 4C illustrates the wave form of the voltage of the signal Vo-Vc which is applied to a negative load. In the wave form diagrams of FIGS. 4A to 4C, a horizontal axis indicates time (sec), a vertical axis indicates the amplitude value of a signal (voltage), and the amplitude value of each signal indicates a value which is normalized by setting the amplitude value of the first high-frequency signal Vo to 1. In FIGS. 5A and 5B, the definitions of the horizontal axis and the vertical axis in the wave form diagram are the same.

As illustrated in FIG. 4A, the first high-frequency signal Vo has a period of 1 sec, a duty ratio of 50%, and an amplitude value of 1. On the other hand, as illustrated in FIG. 4B, the second high-frequency signal Vc is obtained by increasing the frequency of the first high-frequency signal Vo threefold and reducing the amplitude level thereof to one third. The wave forms of the composition signal Vo-Vc of the first high-frequency signal Vo and the second high-frequency signal Vc have each a shape shown in FIG. 4C.

FIG. 5A illustrates absolute values for respective frequencies after fast Fourier transformation is performed on the first high-frequency signal Vo, and FIG. 5B illustrates absolute values for respective frequencies after the fast Fourier transformation is performed on the signal Vo-Vc which is applied to the negative load. In FIGS. 5A and 5B, a horizontal axis indicates a frequency (Hz), and a vertical axis indicates an absolute value obtained after the fast Fourier transformation is performed. The frequency is indicated using the frequency f of a fundamental wave. For example, in the case of a fifth harmonic, it is possible to indicate the frequency as 5f.

As shown in FIG. 5A, in the absolute values for respective frequencies after the fast Fourier transformation is performed on the first high-frequency signal Vo, harmonic components in odd orders (first, third, fifth, seventh, ninth, . . . ) are detected. On the other hand, in the absolute values for respective frequencies after the fast Fourier transformation is performed on the composition signal Vo-Vc of the first high-frequency signal Vo and the second high-frequency signal Vc, harmonic components corresponding to multiples of 3 are not detected. The reason for this is that the harmonic components corresponding to the multiples of 3 are cancelled out or reduced (suppressed) by composing (subtracting) the first high-frequency signal Vo and the second high-frequency signal Vc in which the frequency and the amplitude are appropriately adjusted. With respect to this phenomenon, a case in which a third harmonic is suppressed will be described as an example using an Expression.

The Fourier series expansion of the first high-frequency signal Vo which has a duty ratio of 50% is expressed in Expression 1.

$$V_0 = \frac{1}{2} + \frac{2}{\pi} \sum_{n=0}^{\infty} \frac{\sin\{(2n+1)\omega_0 t\}}{2n+1} \quad \text{Expression 1}$$

$$= \frac{1}{2} +$$

$$\frac{2}{\pi} \left\{ \begin{array}{c} \sin(\omega_0 t) + \frac{1}{3}\sin(3\omega_0 t) + \frac{1}{5}\sin(5\omega_0 t) + \\ \frac{1}{7}\sin(7\omega_0 t) + \frac{1}{9}\sin(9\omega_0 t) + \frac{1}{11}\sin(11\omega_0 t) + \\ \frac{1}{13}\sin(13\omega_0 t) + \frac{1}{15}\sin(15\omega_0 t) + \frac{1}{17}\sin(17\omega_0 t) + \\ \frac{1}{19}\sin(19\omega_0 t) + \frac{1}{21}\sin(21\omega_0 t) + \frac{1}{23}\sin(23\omega_0 t) + \\ \frac{1}{25}\sin(25\omega_0 t) + \frac{1}{27}\sin(27\omega_0 t) + \frac{1}{29}\sin(29\omega_0 t) \ldots \end{array} \right\}$$

On the other hand, the Fourier series expansion of the second high-frequency signal Vc, which is obtained by increasing the frequency of the first high-frequency signal Vo threefold and reducing the amplitude level of the first high-frequency signal Vo to one third, is expressed in Expression 2.

$$V_c = \frac{1}{2 \cdot 3} + \frac{2}{\pi} \sum_{n=0}^{\infty} \frac{\sin\{(2n+1)3\omega_0 t\}}{3(2n+1)} \quad \text{Expression 2}$$

$$= \frac{1}{2 \cdot 3} +$$

$$\frac{2}{\pi} \left\{ \begin{array}{c} \frac{1}{3}\sin(3\omega_0 t) + \frac{1}{9}\sin(9\omega_0 t) + \frac{1}{15}\sin(15\omega_0 t) + \\ \frac{1}{21}\sin(21\omega_0 t) + \frac{1}{27}\sin(27\omega_0 t) + \ldots \end{array} \right\}$$

Further, the Fourier series expansion of the composition signal Vo-Vc which takes a differential between the first high-frequency signal Vo and the second high-frequency signal Vc is expressed in Expression 3.

$$V_0 - V_c = \frac{1}{3} + \frac{2}{\pi} \left\{ \begin{array}{c} \sin(\omega_0 t) + \frac{1}{5}\sin(5\omega_0 t) + \frac{1}{7}\sin(7\omega_0 t) + \\ \frac{1}{11}\sin(11\omega_0 t) + \\ \frac{1}{13}\sin(13\omega_0 t) + \frac{1}{17}\sin(17\omega_0 t) + \\ \frac{1}{19}\sin(19\omega_0 t) + \frac{1}{23}\sin(23\omega_0 t) + \\ \frac{1}{25}\sin(25\omega_0 t) + \frac{1}{29}\sin(29\omega_0 t) \ldots \end{array} \right\} \quad \text{Expression 3}$$

As understood from Expressions 1 to 3, when the frequency is increased threefold and the amplitude level is reduced to one third, a third harmonic and harmonics corresponding to multiples of 3 are cancelled out in theory, and thus it is possible to suppress the third harmonic and the harmonics corresponding to multiples of 3 of the composition signal Vo-Vc.

Meanwhile, in a case in which harmonics other than third harmonic are suppressed, the frequency and the amplitude level may be set in the same manner. For example, when a fifth harmonic and harmonics corresponding to multiples of 5 are suppressed, the second high-frequency signal Vc is obtained by quintupling the frequency of the first high-frequency signal Vo and reducing the amplitude level of the first high-frequency signal Vo to one fifth.

According to the above-described embodiment, the frequency and the amplitude of the second high-frequency signal are obtained by appropriately adjusting the frequency and the amplitude of the first high-frequency signal, and thus it is possible to cancel out or reduce a desired harmonic when the first high-frequency signal is composed with the second high-frequency signal.

For example, the frequency and the amplitude of the second high-frequency signal which is generated by the signal generator 15 are obtained by increasing the frequency of the first high-frequency signal which is generated by the signal generator 11 to a multiple of a predetermined number k and reducing the amplitude of the first high-frequency signal to a fraction of the predetermined number k. Here, it is possible to generate a harmonic signal, in which a desired harmonic is suppressed, by setting the predetermined number k to a desired number.

Therefore, when, for example, 6.78 MHz is set to the frequency of a fundamental wave, it is possible to suppress a third harmonic by setting the k to 3, and thus it is possible to suppress the third harmonic (20.34 MHz) and to generate a high-frequency signal which meets the standard which relates to ISM bands.

As described above, according to the embodiment, it is possible to selectively suppress unnecessary radiation attributable to the harmonics of the main signal, for example, unnecessary radiation which does not meet a standard which relates to telecommunication.

3. Configuration Example of Contactless Electric Power Transmission System

Figure 6:
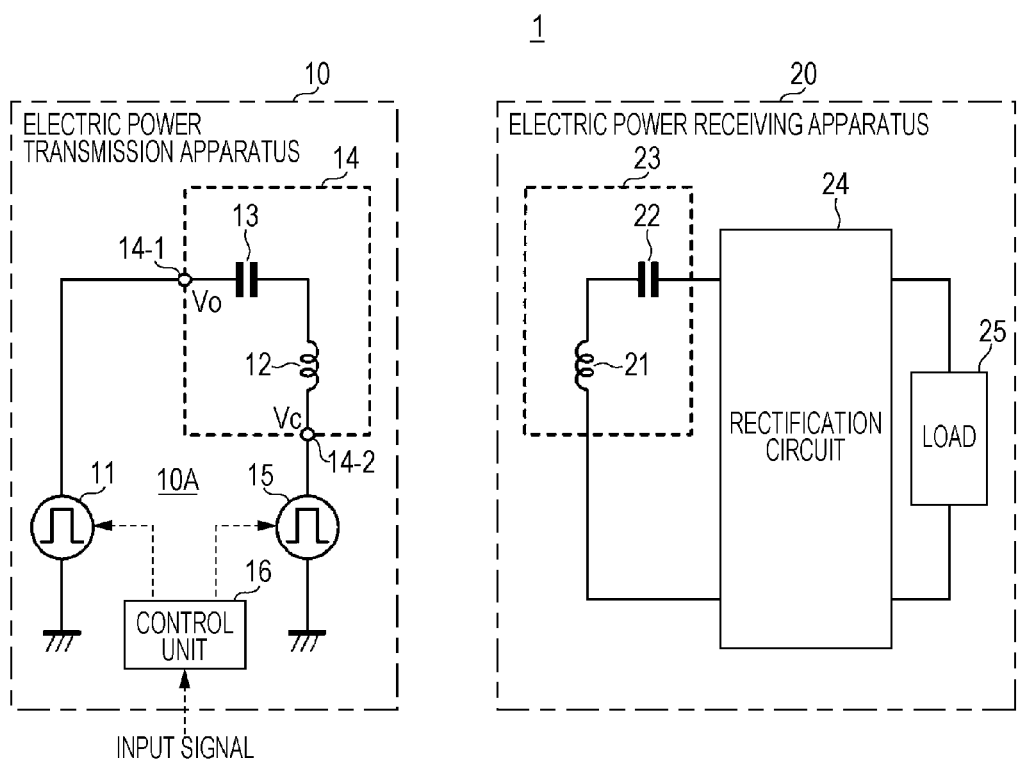
FIG. 6 is a circuit diagram schematically illustrating a contactless electric power transmission system which uses the high-frequency power source according to the embodiment of the present disclosure.

FIG. 6 is a circuit diagram schematically illustrating a contactless electric power transmission system which uses the high-frequency power source according to the embodiment of the present disclosure.

A contactless electric power transmission system 1 includes an electric power transmission apparatus 10 which transmits electric power using a magnetic field in a contactless manner (performs contactless power feeding), and an electric power receiving apparatus 20 which receives the electric power which is transmitted from the electric power transmission apparatus 10 (from magnetic flux).

The electric power transmission apparatus 10 includes a high-frequency power source 10A, a resonance circuit 14 (an example of a negative load) to which a high-frequency signal which is output from the high-frequency power source 10A is supplied, and a control unit 16 which controls the driving of the high-frequency power source 10A. Since the internal configuration and the operation of the electric power transmission apparatus 10 have been described with reference to FIGS. 2 to 5B, the detailed description thereof is omitted.

On the other hand, the electric power receiving apparatus 20 includes an electric power receiving coil 21 which receives electric power from the electric power transmission apparatus 10 in a contactless manner, a resonance capacity 22 which is included in a resonance circuit 23 together with the electric power receiving coil 21, a rectification circuit 24 which converts an AC signal supplied from the resonance circuit 23 into a Direct Current (DC) signal, and a negative load 25. The negative load 25 includes, for example, a battery (secondary battery) which is not shown in the drawing. The rectification circuit 24 may be configured to perform a smoothing process in addition to a rectification process.

In the resonance circuit 23, the electric power receiving coil 21 is connected to the resonance capacity 22 so as to form a series resonance circuit, and the inductance value of the electric power receiving coil 21 and the capacitance value of the resonance capacity 22 are adjusted such that resonance is performed at a power feeding frequency. As electric power which is transmitted from the electric power transmission apparatus 10 (primary side) is higher, electric power which can be received by the electric power receiving apparatus 20 (secondary side) is larger. Meanwhile, the configuration of the resonance circuit 23 is not limited to this example, and various configurations may be taken as the same as the case of the resonance circuit 14 of the electric power transmission apparatus 10.

In a wireless power feeding system (contactless electric power transmission system), a magnetic flux (magnetic field) which is discharged from the coil of the resonance circuit is large in order to transmit electric power from the electric power transmission apparatus to the electric power receiving apparatus in a contactless manner. Accordingly, unnecessary radiation is easily increased. In contrast, according to the contactless electric power transmission system according to the embodiment, the electric power transmission apparatus has a configuration in which the differential between the first high-frequency signal and the second high-frequency signal is taken, and a specific harmonic component is cancelled out or reduced. Therefore, it is possible to remove the specific harmonic component from the electric power transmission signal which is output by the electric power transmission apparatus, and it is possible to suppress the radiation of an unnecessary frequency component.

Meanwhile, in the magnetic field resonance-type contactless electric power transmission system, the negative load on the side of electric power transmission apparatus is a resonance circuit, and has a constant filtering effect which suppresses a harmonic component. However, the effect is limited. It is possible to further effectively remove a harmonic component from the electric power transmission signal which is output by the electric power transmission apparatus and to suppress unnecessary radiation by applying the technology of the present disclosure.

Further, the magnetic field resonance-type contactless electric power transmission system has a characteristic that it is possible to perform electric power transmission with high efficiency. On this point, the technology of the present disclosure which does not use a sine wave signal in which efficiency is easy to deteriorate may be suitable for the magnetic field resonance-type contactless electric power transmission system.

4. Modification Example

A second signal generation unit (for example, the signal generator 15) which generates a cancellation second high-frequency signal has a high operation frequency and a low operation power-supply voltage (for example, power-supply voltage Vcc2), compared to a first signal generation unit (for example, the signal generator 11). Accordingly, the second signal generation unit may be configured using a different kind of device which is optimal to the behavior thereof. That is, the specifications of the first signal generation unit and the second signal generation unit may not be completely the same or symmetrical.

When the above-described high-frequency power source (for example, the high-frequency power source 10A) is implemented, there is a case in which the output wave form of each signal generation unit is not an ideal square. In this case, the optimization of the suppression amount may be attempted by finely adjusting the amplitude, the phase, or the duty ratio of the second high-frequency signal which is generated by the second signal generation unit. For example, when the amplitude of the second high-frequency signal is reduced to ⅓, the amplitude may not be accurately reduced to ⅓ (=0.33 . . . ), and may be set to 0.3 in accordance with an implementation apparatus.

In addition, although half-bridge inverters are used for the first and second signal generation units in the above-described embodiment, the technology of the present disclosure may be applied to a different type of signal generator which outputs a square wave.

Meanwhile, the present disclosure can include configurations as follows:

(1) An electric power transmission apparatus including: a resonance circuit that is used for contactless electric power transmission; a first signal generation unit that is connected to one end of the resonance circuit, and is configured to generate a first high-frequency signal which includes one or more harmonic components using a switching method; and a second signal generation unit that is connected to another end of the resonance circuit, and is configured to generate a second high-frequency signal which includes a specific harmonic component using the switching method, wherein the first high-frequency signal is input to the one end of the resonance circuit, and the second high-frequency signal is input to the another end of the resonance circuit.

(2) In the electric power transmission apparatus of (1), a frequency and an amplitude of the second high-frequency signal which is generated by the second signal generation unit are values which are obtained by increasing a frequency of the first high-frequency signal to a multiple of a predetermined number and by reducing an amplitude of the first high-frequency signal to a fraction of the predetermined number.

(3) In the electric power transmission apparatus of (1) or (2), the harmonic components which are included in the second high-frequency signal correspond to at least one harmonic component of the harmonic components which are included in the first high-frequency signal.

(4) In the electric power transmission apparatus of (2) or (3), the frequency and the amplitude of the second high-frequency signal are respectively obtained by increasing the frequency of the first high-frequency signal k times (k is a natural number) and reducing the amplitude of the first high-frequency signal to a fraction of k.

(5) In the electric power transmission apparatus of any one of (1) to (4), the first high-frequency signal and the second high-frequency signal are substantially square waves.

(6) A contactless electric power transmission system including: an electric power transmission apparatus that transmits electric power in a contactless manner; and an electric power receiving apparatus that receives the electric power from the electric power transmission apparatus, the electric power transmission apparatus includes: a resonance circuit that is used for contactless electric power transmission; a first signal generation unit that generates a first high-frequency signal which includes one or more harmonic components using a switching method; and a second signal generation unit that generates a second high-frequency signal which includes a specific harmonic component using the switching method, the first high-frequency signal is input to one end of the resonance circuit, and the second high-frequency signal is input to another end of the resonance circuit.

(7) A signal generation method including: generating a first high-frequency signal which includes one or more harmonic components using a switching method by a first signal generation unit; generating a second high-frequency signal which includes a specific harmonic component using the switching method by a second signal generation unit; and generating a composition signal by differentially driving the first high-frequency signal and the second high-frequency signal.

A series of processes according to each of the above-described examples of the embodiment can be performed using hardware, and can be performed using software. When the series of processes are performed using software, the series of processes can be performed by a computer in which a program included in the software is embedded in dedicated hardware, or a computer in which a program used to perform various types of functions is installed. For example, a program included in the desired software may be installed and performed in a general-purpose personal computer.

In addition, in this specification, a process step in which a chronological process is described includes a process which is chronologically performed along the described order, and a process which is not necessarily chronologically processed and which is performed in parallel or individually (for example, a parallel process or a process based on an object).

Hereinbefore, the present disclosure is not limited to each of the above-described embodiments, and it is apparent that various types of the other modification examples and application examples can be included without departing from the gist disclosed in Claims.

That is, since the example of each of the above-described embodiments is an appropriate detailed example of the present disclosure, technically preferable various limitations are made. However, the technical range of the present disclosure is not limited to the embodiment if there is no particular description of the gist of the limitation of the present disclosure in each description. For example, the materials used which are mentioned in the description below, the used amount thereof, processing time, processing order, and the numerical condition of each parameter are only preferred examples, and the dimension, the shape, and the arrangement relationship of each drawing used for the description are approximate.

The present disclosure contains subject matter related to that disclosed in Japanese Priority Patent Application JP 2012-094895 filed in the Japan Patent Office on Apr. 18, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electric power transmission apparatus comprising:
   a resonance circuit that is used for contactless electric power transmission;
   a first signal generation unit that is connected to one end of the resonance circuit, and is configured to generate a first high-frequency signal which includes one or more harmonic components using a switching method; and
   a second signal generation unit that is connected to another end of the resonance circuit, and is configured to generate a second high-frequency signal which includes a specific harmonic component using the switching method,
   wherein the first high-frequency signal is input to the one end of the resonance circuit, and the second high-frequency signal is input to the another end of the resonance circuit, and
   wherein a frequency of the second high-frequency signal which is generated by the second signal generation unit is a value which is obtained by increasing a frequency of the first high-frequency signal to a multiple of a predetermined number.

2. The electric power transmission apparatus according to claim 1,
   wherein an amplitude of the second high-frequency signal which is generated by the second signal generation unit is a value which is obtained by reducing an amplitude of the first high-frequency signal to a fraction of the predetermined number.

3. The electric power transmission apparatus according to claim 2,
   wherein the harmonic components which are included in the second high-frequency signal correspond to at least one harmonic component of the harmonic components which are included in the first high-frequency signal.

4. The electric power transmission apparatus according to claim 3, wherein the frequency and the amplitude of the second high-frequency signal are respectively obtained by increasing the frequency of the first high-frequency signal k times (k is a natural number) and reducing the amplitude of the first high-frequency signal to a fraction of k.

5. The electric power transmission apparatus according to claim 1,
wherein the first high-frequency signal and the second high-frequency signal are substantially square waves.

6. A contactless electric power transmission system comprising:
an electric power transmission apparatus that transmits electric power in a contactless manner; and
an electric power receiving apparatus that receives the electric power from the electric power transmission apparatus,
wherein the electric power transmission apparatus includes:
a resonance circuit that is used for contactless electric power transmission;
a first signal generation unit that generates a first high-frequency signal which includes one or more harmonic components using a switching method; and
a second signal generation unit that generates a second high-frequency signal which includes a specific harmonic component using the switching method,
wherein the first high-frequency signal is input to one end of the resonance circuit, and the second high frequency signal is input to another end of the resonance circuit, and
wherein a frequency of the second high-frequency signal which is generated by the second signal generation unit is a value which is obtained by increasing a frequency of the first high-frequency signal to a multiple of a predetermined number.

7. The contactless electric power transmission system according to claim 6,
wherein an amplitude of the second high-frequency signal which is generated by the second signal generation unit is a value which is obtained by reducing an amplitude of the first high-frequency signal to a fraction of the predetermined number.

8. A signal generation method comprising:
generating a first high-frequency signal which includes one or more harmonic components using a switching method by a first signal generation unit;
generating a second high-frequency signal which includes a specific harmonic component using the switching method by a second signal generation unit; and
generating a composition signal using differential between the first high-frequency signal and the second high-frequency signal,
wherein a frequency of the second high-frequency signal which is generated by the second signal generation unit is a value which is obtained by increasing a frequency of the first high-frequency signal to a multiple of a predetermined number.

9. The signal generation method according to claim 8,
wherein an amplitude of the second high-frequency signal which is generated by the second signal generation unit is a value which is obtained by reducing an amplitude of the first high-frequency signal to a fraction of the predetermined number.

* * * * *